United States Patent [19]

Moffatt

[11] Patent Number: 4,594,894
[45] Date of Patent: Jun. 17, 1986

[54] ANGULAR VELOCITY SENSOR

[75] Inventor: E. Marston Moffatt, Glastonbury, Conn.

[73] Assignee: United Technologies Corporation, Hartford, Conn.

[21] Appl. No.: 647,519

[22] Filed: Sep. 4, 1984

[51] Int. Cl.$^4$ ............................................. G01P 15/00
[52] U.S. Cl. .............................. 73/515; 73/516 LM; 73/521
[58] Field of Search ................... 73/521, 515, 516 LM

[56] References Cited

U.S. PATENT DOCUMENTS 3,500,690  3/1970  Schuemann .................. 73/516 LM
3,581,578  6/1971  Schuemann .......................... 73/515
4,020,700  5/1977  Lopiccolo et al. ............ 73/516 LM Primary Examiner—Anthony V. Ciarlante
Attorney, Agent, or Firm—Francis J. Maguire, Jr.

[57] ABSTRACT

The accuracy of a fluid jet angular velocity sensor is increased by reducing flow disturbances which tend to increase the device's temperature sensitivity.

4 Claims, 4 Drawing Figures

ANGULAR VELOCITY SENSOR

DESCRIPTION

1. Technical Field

This invention relates to angular velocity sensors, and more particularly to angular velocity sensors having sensing elements cooled differentially by a fluid jet in the presence of sensor rotation.

2. Background Art

Fluid jet angular velocity sensors utilizing sensing elements for sensing the speed of rotation are well known in the art. U.S. Pat. No. 3,500,690 to Schueman, U.S. Pat. No. 4,020,700 to Lopiccolo et al., and U.S. Pat. No. 3,581,578 to Schueman, all disclose fluid jet angular velocity sensors having a pair of sensing elements for sensing the speed of rotation about an axis perpendicular to a "plane of sensitivity".

The sensing elements are usually positioned symmetrically about a reference jet axis with each element on opposite sides and at equal distances therefrom. A fluid jet is directed along the reference jet axis from a nozzle which cools the sensing elements in substantially equal proportions in the absence of sensor rotation. Due to the well-known Coriolis effect, the fluid jet impinges nonsymmetrically, i.e., the fluid jet "bends" in the presence of sensor rotation. Because of the well-known characteristic of fluid jets in which the higher velocity fluid particles are concentrated at the center of the jet and the lower velocity particles around its periphery, the sensing elements are cooled in different proportions whenever the fluid jet impinges nonsymmetrically upon the sensing elements.

The sensing elements of each pair are typically wired into a bridge circuit. Slight variations in the resistance values of each of the sensing elements can be balanced out during calibration of the device in the absence of the cooling effects of the jet and in the absence of any applied angular rotation. This is known as the "static null". If a fluid jet is directed at the sensing elements, still in the absence of any applied rotation, the bridge may be balanced for the particular jet velocity selected. This is known as the "dynamic null".

The static null can be balanced out in operation, but the dynamic null varies with both jet velocity and temperature. Jet velocity is set by the voltage setting on, for example, a piezo-electric pump that generates the pressure for the fluid jet.

A convenient quantity consisting of the difference value (delta) between the dynamic null and the static null is utilized in null calibration techniques. At each temperature the pump develops a characteristic jet velocity set by pump voltage. Thus the delta value can be plotted versus pump voltage at each temperature. A set of temperature curves can be stored in a computer memory and used to correct the delta value when the sensor is used.

If the pump voltage does not repeat perfectly with temperature, or if there is a temperature hysteresis in the pump, the curves can become inaccurate.

A means of decreasing the sensitivity of an angular velocity sensor to temperature and pump voltage changes during operation is needed.

DISCLOSURE OF INVENTION

The object of the present invention is to minimize the slope of the delta versus pump voltage curves for various operating temperatures, i.e., to make the change in delta minimum over a wide pump voltage swing.

According the present invention an annular vortex surrounding the main jet is shaped by machining an annular groove at the nozzle exit so that the vortex flow, where it meets the main jet, is directed parallel to the jet flow so that any disturbances to the main jet at this point will be minimized.

According to a second aspect of the present invention, the pump frequency is optimized at 3000 hertz which was found experimentally to make tne flow curves flatter and is particularly successful in reducing the temperature variation of the delta value.

The present invention provides a highly effective means of minimizing both jet velocity and temperature sensitivity in angular rate sensors of this kind. As increasing levels of research and experimentation have revealed, rate sensors of this kind are highly sensitive to very slight structural variations. Tolerances are critical and the symmetry of the device must be carefully considered in the initial design. By providing a vortex shaping means for directing vortex flow substantially parallel to and in the same direction as the jet flow at the exit of the nozzle where the vortex meets the jet, the present invention helps to minimize the potentially serious delta variations described above. Thus, the accuracy of the sensor is significantly enhanced by simply shaping the vortex flow in the manner disclosed. Additionally, optimizing the frequency of the pump, to provide a particular jet velocity similarly reduces delta variations.

These and other objects, features, and advantages of the present invention will become more apparent in light of the detailed description of a best mode embodiment thereof as illustrated in the accompanying drawing.

BEST MODE FOR CARRYING OUT INVENTION

Figure 1:
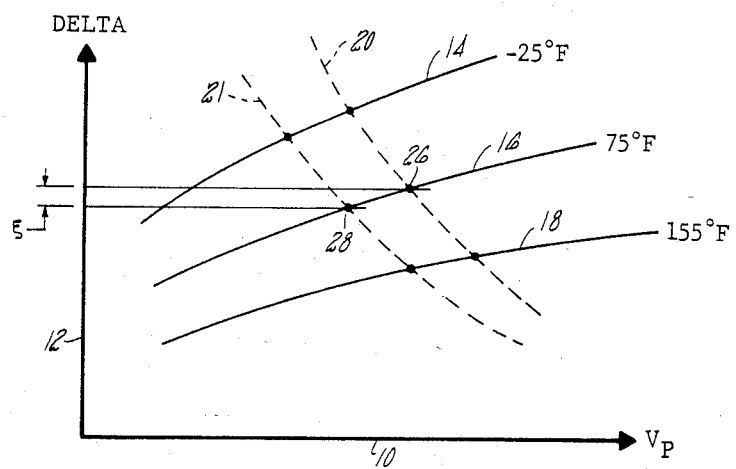
FIG. 1 is a delta calibration versus temperature and pump voltage curve.

Referring to FIG. 1, an illustrtion of a typical delta calibration versus temperature and pump voltage ($V_p$) curve is shown. As explained above, the difference between the dynamic null and the static null is referred to as "delta". Although the static null can be balanced out in operation, delta cannot be compensated directly because it varies with both jet velocity and temperature. Jet velocity is set by the voltage setting on the pump that generates the pressure for the jet.

The coordinate system of FIG. 1 has its abscissa 10 denominated in values of pump voltage ($V_p$). As explained above, the pump voltage controls the jet velocity. It does this by increasng the amplitude of the displacement of the pump diaphragm. The ordinate 12 of the coordinate system is denominated in values of delta. As explained above, delta equals the difference between the dynamic null and the static null. Three curves are shown for three separate temperature values. A first curve 14 is shown for a constant temperature of negative 25 degrees Fahrenheit. A second curve 16 is shown for a constant temperature of 75 degrees Fahrenheit. A third curve 18 is shown for a constant temperature of 155 degrees Fahrenheit.

A pump operating line 20 (shown in dashed lines) illustrates a typical variation of delta for a changing pump voltage at different temperatures. The pump operating line 20 is nominally a line of constant Reynolds number. An undesirable shift in $V_p$ caused by, for example, temperature induced mechanical hysteresis can cause the operating line 20 to shift to the position of dashed line 21.

Figure 2:
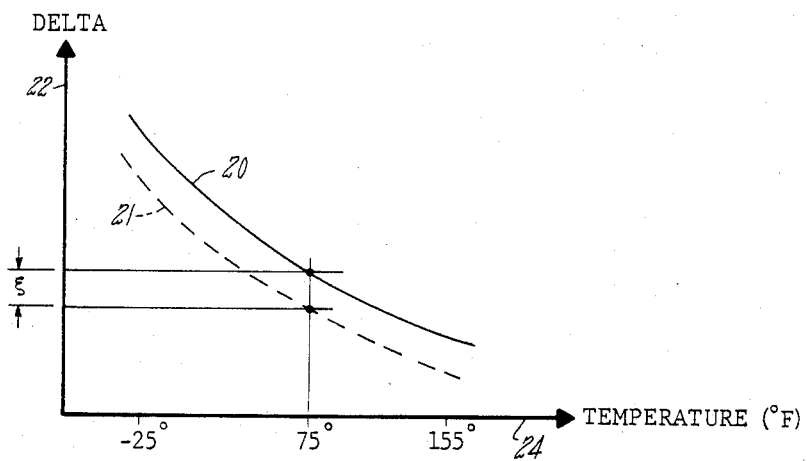
FIG. 2 is a delta versus temperature plot.

FIG. 2 shows the pump operating lines 20 and 21 of FIG. 1 redrawn on a coordinate system having delta plotted against temperature. The delta values are denominated along an ordinate 22 while temperature values are denominated along an abscissa 24. This curve, among others, is stored in computer memory and used to correct the delta value when the angular velocity sensor is used.

If the pump voltage does not repeat perfectly with temperature, or if there is temperature induced mechanical hysteresis in the pump, the operating line 20 of both FIGS. 1 and 2 can shift as mentioned above. FIG. 1 shows a shift from a point 26 to a point 28 at 75 degrees Fahrenheit. The corresponding change in delta is the amount "ξ", as shown. This error is also shown in FIG. 2 and represents an error in the computed dynamic null. It may be seen that it is proportional to the slope of the flow curves in FIG. 1.

The first object of this invention, i.e., to flatten the flow curves as much as possible or, stated otherwise, to make the change in delta miminum over a wide pump voltage swing is effectuated by shaping the vortex of fluid which is formed around an operating sensor's fluid jet.

Figure 3:
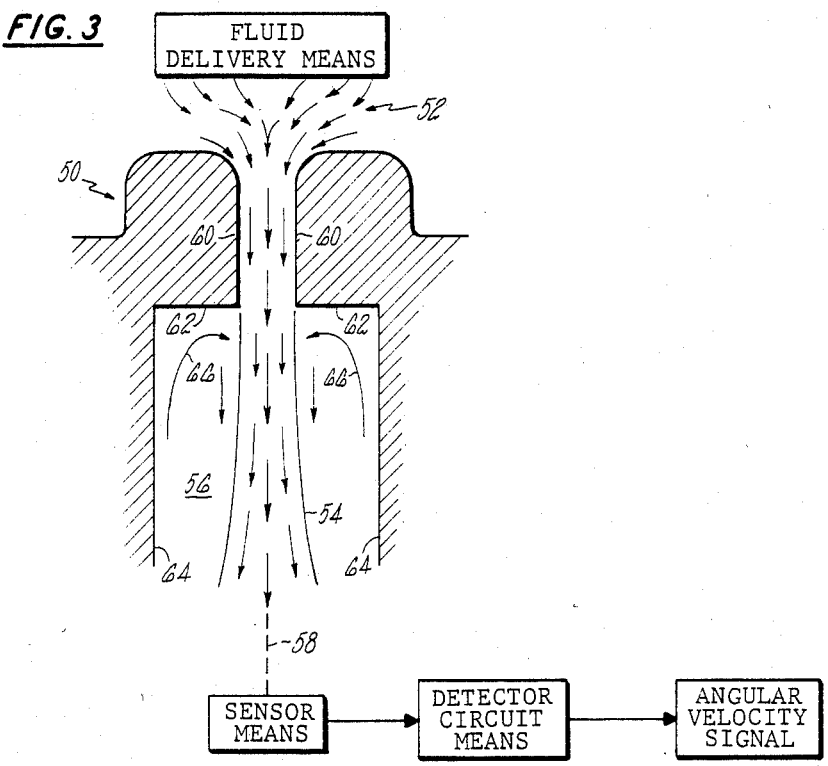
FIG. 3 is an illustration of an jet within an angular velocity sensor surrounded by an annular vortex.

FIG. 3 is an illustration for a sensor 50 having a nozzle 52 for receiving pressurized fluid. A jet stream 54 is formed within a jet chamber 56 having a longitudinal reference jet axis 58 down the center of the chamber 56. The walls 60 of the nozzle 52 enter the chamber 56 at a point adjacent two back walls 62 of the chamber 56. As may be seen from FIG. 3, the back walls 62 are perpendicular to the jet reference axis 58 and also perpendicular to the chamber's side walls 64. This particular configuration has been found by applicant to create a fluid vortex having velocity components 66 directed radially inward at the nozzle exit. Any disturbance to the main jet 54 at this point creates a serious problem since a very small deflection here can create a much larger disturbance at the sensor wires.

Figure 4:
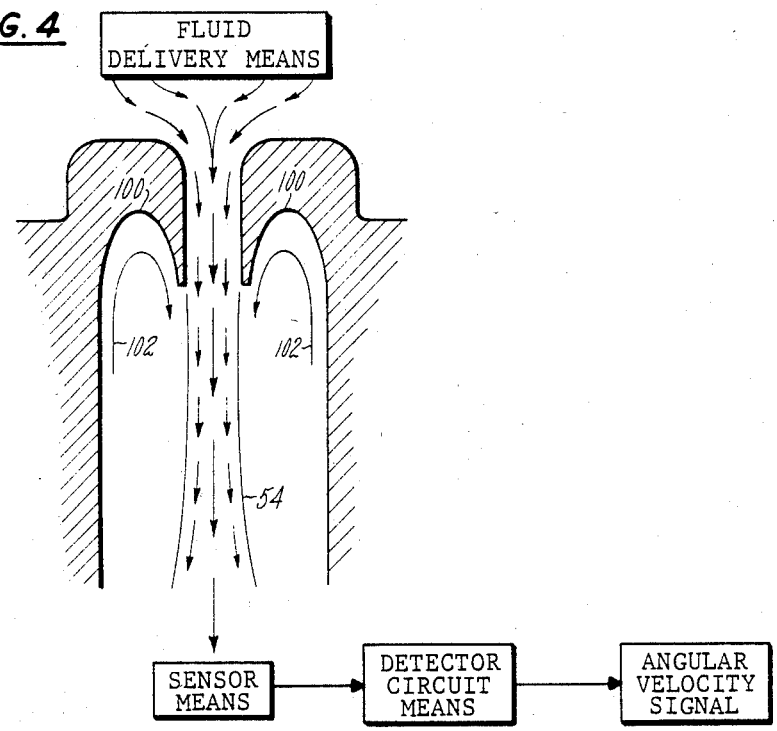
FIG. 4 is an illustration of an angular velocity sensor according to the present invention having an annular groove machined adjacent to the nozzle exit.

FIG. 4 shows that by machining an annular groove 100 at the nozzle exit, the vortex flow, 102, where it meets the main jet, has been re-directed to be parallel to the jet flow 54 so that any irregularities will not cause non-symmetrical deflections in the main jet.

It should be understood that the invention may be practiced as well in angular rate sensors having curtain holes. In that case, the curtain hole flow joins the main jet very near the nozzle and tends to insulate it from disturbances due to the vortex flow.

The second object of the present invention, i.e., to determine the optimum pump frequency for achieving the flattest flow curves for the particular sensor's configuration was experimentally achieved. It was found that a frequency of 3000 hertz is optimum for a chamber having the following approximate dimensions:

nozzle length—0.44 cm.

length of chamber from nozzle exit to diaphram 1.74 cm length of chamber from nozzle exit to sensing elements—1.2 cm.

width of chamber—0.9 cm.

width of diaphram chamber 1.7 cm.

Of course, these dimensions should not be thought of as absolute values. The general shape and dimensions of a sensor in which a frequency value of 3000 hertz is optimum has been shown. The exact reasons for the optimizing of frequency at this value for the particular configuration described are not known but it is believed that this improvement is due to, among other things, eliminating an acoustic resonance that disturbs the flow. Perhaps a standing wave that creates a static pressure which deflects the wave is minimized at 3000 Hz. Similarly, it should be understood that variations in the dimensions described above can be made while at the same time changing the optimum frequency. However, the degree to which the frequency would change and under what circumstances of change in the described configuration is unknown.

Similarly, it should be understood that although the invention has been shown and described with respect to a particular embodiment thereof, various other changes, omissions, and additions in the form and detail thereof may be made therein without departing from spirit and scope of the invention.

I claim:

1. Angular velocity sensor means, comprising:
   housing means, for enclosing a jet chamber having a reference jet axis and having nozzle means disposed at one end of said chamber for discharging a fluid jet along said reference jet axis, said fluid jet surrounded by a fluid vortex which meets said jet at the exit of said nozzle;
   fluid delivery means, for delivering a fluid under pressure to said nozzle to form said fluid jet;
   sensor means, having at least one pair of sensing elements, disposed symmetrically, at an opposite end of said chamber, about said reference jet axis in a plane perpendicular thereto, each pair of sensing elements being cooled differentially in response to deflection of said fluid jet from said reference jet axis in the presence of sensor rotation about a rotation axis perpendicular to said reference jet axis, said deflection being in proportion to the angular velocity of said sensor, each of said sensing elements having resistance values which vary according to the amount of cooling received by each;
   detector circuit means, responsive to said sensing elements' resistance values for providing signals indicative of said angular velocity; and
   fluid vortex shaping means for directing vortex flow substantially parallel to and in the same direction as the jet flow at said exit of said nozzle where said vortex meets said jet.

2. The sensor of claim 1, wherein said jet chamber is cylindrical in shape having a central longitudinal reference jet axis and wherein said fluid vortex occupies a surrounding cylinder about said fluid jet.

3. The sensor of claim 1, wherein said fluid vortex shaping means comprises an annular concave surface disposed at the nozzle end of said chamber.

4. The sensor of claim 1, wherein said fluid delivery means comprises a pump having a diaphragm that is caused to vibrate substantially at a frequency of 3000 hertz.

* * * * *